US011725159B2

United States Patent
Qin et al.

(10) Patent No.: US 11,725,159 B2
(45) Date of Patent: Aug. 15, 2023

(54) STABILIZED LUBRICANT COMPOSITIONS AND HEAT TRANSFER COMPOSITIONS CONTAINING THE SAME

(71) Applicant: Milliken & Company, Spartanburg, SC (US)

(72) Inventors: Haihu Qin, Greer, SC (US); Richard Lawson, Greer, SC (US); Mark Ragsdale, Duncan, SC (US); Sanjeev Dey, Spartanburg, SC (US)

(73) Assignee: Milliken & Company

( * ) Notice: Subject to any disclaimer, the term of this patent is extended or adjusted under 35 U.S.C. 154(b) by 0 days.

(21) Appl. No.: 17/577,499

(22) Filed: Jan. 18, 2022

(65) Prior Publication Data

US 2022/0243142 A1 Aug. 4, 2022

Related U.S. Application Data

(60) Provisional application No. 63/143,925, filed on Jan. 31, 2021.

(51) Int. Cl.
| | |
|---|---|
| *C10M 171/00* | (2006.01) |
| *C09K 5/04* | (2006.01) |
| *C10M 107/24* | (2006.01) |
| *C10M 107/32* | (2006.01) |
| *C10M 129/66* | (2006.01) |
| *C10N 20/00* | (2006.01) |
| *C10N 40/30* | (2006.01) |

(52) U.S. Cl.
CPC ......... *C10M 171/008* (2013.01); *C09K 5/044* (2013.01); *C10M 107/24* (2013.01); *C10M 107/32* (2013.01); *C10M 129/66* (2013.01); *C09K 2205/122* (2013.01); *C10M 2207/24* (2013.01); *C10M 2209/043* (2013.01); *C10M 2209/1023* (2013.01); *C10N 2020/097* (2020.05); *C10N 2040/30* (2013.01)

(58) Field of Classification Search
CPC ............ C10M 171/008; C10M 107/24; C10M 107/32; C10M 129/66; C10M 2207/24; C10M 2209/043; C10M 2209/1023; C10M 2207/042; C10M 2207/281; C10M 2207/2835; C09K 5/044; C09K 2205/122; C09K 5/045; C10N 2020/097; C10N 2040/30; C10N 2020/02; C10N 2020/101; C10N 2030/10

See application file for complete search history.

(56) References Cited

U.S. PATENT DOCUMENTS

| | | | | |
|---|---|---|---|---|
| 5,366,646 | A * | 11/1994 | Sato | C10M 137/14 252/79 |
| 6,235,687 | B1 * | 5/2001 | Nadasdi | C10M 125/18 508/579 |
| 9,410,105 | B2 * | 8/2016 | DeSantis | C10M 137/105 |
| 2014/0142008 | A1 | 5/2014 | Desantis | |
| 2019/0225906 | A1 * | 7/2019 | Koban | C10M 107/34 |
| 2019/0249055 | A1 * | 8/2019 | Sethi | F25B 45/00 |
| 2020/0208882 | A1 | 7/2020 | Ota | |
| 2020/0347283 | A1 * | 11/2020 | Itano | C09K 5/045 |
| 2022/0186138 | A1 * | 6/2022 | Matsumoto | C10M 107/24 |

FOREIGN PATENT DOCUMENTS

| | | |
|---|---|---|
| JP | 2008208262 A | 9/2008 |
| WO | 2013138123 A1 | 9/2013 |
| WO | WO-2020204162 A1 * | 10/2020 ............ C09K 5/045 |

OTHER PUBLICATIONS

International Search Report and Written Opinion issued in App. No. PCT/US2022/012712, dated Jun. 15, 2022, 17 pages.

* cited by examiner

*Primary Examiner* — Pamela H Weiss
(74) *Attorney, Agent, or Firm* — Robert M. Lanning

(57) ABSTRACT

A lubricant composition comprises a lubricant and a stabilizer. The stabilizer comprises a first epoxide group and a second functional group selected from the group consisting of (i) a second epoxide group; (ii) an aliphatic carbon-carbon multiple bond conjugated with a second carbon-carbon multiple bond; (iii) an aliphatic carbon-carbon multiple bond conjugated with an electron withdrawing group; and (iv) an aliphatic carbon-carbon multiple bond conjugated with an aromatic group. A heat transfer composition comprises a lubricant composition as described above and a haloalkane, such as an iodoalkane (e.g., trifluoroiodomethane).

7 Claims, No Drawings

STABILIZED LUBRICANT COMPOSITIONS AND HEAT TRANSFER COMPOSITIONS CONTAINING THE SAME

CROSS-REFERENCE TO RELATED PATENT APPLICATIONS

This patent application claims, pursuant to 35 U.S.C. § 119(e), priority to and the benefit of the filing date of U.S. Patent Application No. 63/143,925 filed on Jan. 31, 2021.

TECHNICAL FIELD OF THE INVENTION

This application relates to lubricant compositions containing a stabilizer, such as lubricant compositions intended to be combined with a refrigerant to produce a heat transfer composition intended for use in heat exchange systems (e.g., refrigeration units, air conditioning units, and heat pump systems). The application also relates to heat transfer compositions containing such lubricant compositions.

BACKGROUND

Mechanical refrigeration systems, and related heat transfer devices, such as heat pumps and air conditioners are well known in the art for industrial, commercial and domestic uses. Chlorofluorocarbons (CFCs) were developed in the 1930s as refrigerants for such systems. However, in the 1980s, the effect of CFCs on the stratospheric ozone layer became the focus of much attention, leading to governmental action to phase-out the use of CFCs. Accordingly, CFCs were replaced with more environmentally acceptable materials that contain hydrogen, namely the hydrochlorofluorocarbons (HCFCs). Notwithstanding the more acceptable environmental impact of HCFCs, these materials were also scheduled for eventual phase-out.

In response to these phase-outs, the industry has developed hydrofluorocarbons (HFCs) which have zero ozone depletion potential, such as R-410A (a 50:50 w/w blend of difluoromethane (HFC-32) and pentafluoroethane (HFC-125)). While R-410A has a more acceptable Ozone Depleting Potential (ODP) than CFCs and HCFCs (such as R-22), the continued use of R-410A is problematic since it has a high Global Warming Potential (GWP) of 2088. Therefore, some in the industry have moved to develop a replacement for R-410A that has a lower GWP and is more environmentally acceptable.

In order to produce a replacement that can be utilized in equipment designed for use with R-410A, some of these efforts have led to the development of refrigerants containing a blend of difluoromethane, pentafluoroethane, and trifluoroiodomethane. These refrigerants have both an acceptable (near zero) ODP and a GWP that is substantially lower than the GWP of R-410a.

Inside a refrigeration system, the refrigerant is typically used in combination with a lubricant that circulates within the system and lubricate the mechanical parts, such as the compressor. The refrigerant and lubricant are also typically used in combination with one or more stabilizers that are intended to prevent or slow degradation of the lubricant and/or refrigerant in the system. The inclusion of iodoalkanes within the refrigerants described above has revealed the need for improved stabilizers that are capable of preventing or slowing the degradation of components within refrigeration systems utilizing such iodoalkane-containing refrigerants.

A need therefore remains for improved stabilizers and compositions containing such stabilizers that can be used in combination with these new haloalkane-containing refrigerants, particularly those refrigerants containing an iodoalkane, such as trifluoroiodomethane. The present application seeks to provide such stabilizers and compositions comprising the same.

BRIEF SUMMARY OF THE INVENTION

In a first embodiment, the invention provides a lubricant composition comprising a lubricant and a stabilizer. The stabilizer preferably comprises a first epoxide group and a second functional group selected from the group consisting of (i) a second epoxide group; (ii) an aliphatic carbon-carbon multiple bond conjugated with a second carbon-carbon multiple bond; (iii) an aliphatic carbon-carbon multiple bond conjugated with an electron withdrawing group; and (iv) an aliphatic carbon-carbon multiple bond conjugated with an aromatic group.

In a second embodiment, the invention provides a heat transfer composition comprising a lubricant composition according to the first embodiment and a haloalkane.

DETAILED DESCRIPTION OF THE INVENTION

In a first embodiment, the invention provides a lubricant composition comprising a lubricant and a stabilizer.

The lubricant present in the lubricant composition can be any suitable lubricant, such as any of the lubricants utilized in heat exchange systems. Suitable lubricants include, but are not limited to, polyol esters (POEs), polyalkylene glycols (PAGs), silicone oils, mineral oil, alkylbenzenes (ABs), polyvinyl ethers (PVEs) poly(alpha-olefins) (PAOs), and mixtures thereof. Preferably, the lubricant is selected from the group consisting of polyol esters (POEs), polyalkylene glycols (PAGs), mineral oil, alkylbenzenes (ABs), polyvinyl ethers (PVEs) and mixtures thereof. In another preferred embodiment, the lubricant is selected from the group consisting of polyol esters (POEs), mineral oil, alkylbenzenes (ABs), polyvinyl ethers (PVEs) and mixtures thereof. In one preferred embodiment, the lubricant is a polyol ester lubricant. In another preferred embodiment, the lubricant is a polyvinyl ether lubricant.

Commercially available polyvinyl ethers include those lubricants sold under the trade designations FVC32D and FVC68D by Idemitsu. Commercially available mineral oils include Witco LP 250 from Witco, Suniso 3GS from Witco and Calumet R015 from Calumet. Commercially available alkylbenzene lubricants include Zerol 150 and Zerol 300 from Shrieve Chemical. Commercially available polyol esters include neopentyl glycol dipelargonate, which is available as Emery 2917 and Hatcol 2370, and pentaerythritol derivatives including those sold under the trade designations Emkarate RL32-3MAF and Emkarate RL68H by CPI Fluid Engineering. The pentaerythritol derivative polyol ester lubricants, including Emkarate RL32-3MAF and Emkarate RL68H, are particularly preferred lubricants.

The stabilizer preferably comprises a first epoxide group. The stabilizer further comprises a second functional group selected from the group consisting of (i) a second epoxide group; (ii) an aliphatic carbon-carbon multiple bond conjugated with a second carbon-carbon multiple bond; (iii) an aliphatic carbon-carbon multiple bond conjugated with an electron withdrawing group; and (iv) an aliphatic carbon-carbon multiple bond conjugated with an aromatic group.

For those stabilizer compounds comprising a first epoxide group and a second epoxide group, the stabilizer can contain more than two epoxide groups (e.g., the stabilizer can contain three or more epoxide groups). For those groups which comprise an aliphatic carbon-carbon multiple bond, the aliphatic carbon-carbon multiple bond can be either a double bond or a triple bond, with a carbon-carbon double bond being particularly preferred. Thus, for example, the second functional group can comprise an aliphatic carbon-carbon double bond conjugated with a second carbon-carbon multiple bond (e.g., a second carbon-carbon double bond). For those groups which comprise an aliphatic carbon-carbon multiple bond conjugated with another group (i.e., another carbon-carbon multiple bond, an electron withdrawing group, or an aromatic group), the aliphatic carbon-carbon multiple bond can be conjugated with more than one such group. Thus, the aliphatic carbon-carbon multiple bound can be conjugated with two (or even more) carbon-carbon multiple bonds, electron withdrawing groups, or aromatic groups. Indeed, the aliphatic carbon-carbon multiple bond can even be conjugated with more than one type of these other groups. For instance, the aliphatic carbon-carbon multiple bond can be conjugated with one or more carbon-carbon multiple bonds as well as one or more electron withdrawing groups and/or one or more aromatic groups. Lastly, the stabilizer compound can comprise a second epoxide group as well as at least one aliphatic carbon-carbon multiple bond conjugated as described above.

In a preferred embodiment, the stabilizer comprises a first epoxide group and a second epoxide group. The first and second epoxide groups of the stabilizer can be linked by any suitable linking group, such as a linear or branched alkyl group that can optionally be substituted, for example, with hydroxy groups and or ether linkages. In a preferred embodiment, the stabilizer is selected from the group consisting of 1,2,7,8-diepoxyoctane, 1,4-butanediol diglycidyl ether, trimethylolpropane triglycidyl ether, and mixtures thereof. In one preferred embodiment, the stabilizer is 1,2,7,8-diepoxyoctane. In another preferred embodiment, the stabilizer is 1,4-butanediol diglycidyl ether. In yet another preferred embodiment, the stabilizer is trimethylolpropane triglycidyl ether.

In another preferred embodiment, the stabilizer comprises a first epoxide group and an aliphatic carbon-carbon multiple bond conjugated with an electron withdrawing group. As noted above, the carbon-carbon multiple bond can be either a double or triple bond, with a carbon-carbon double bond being particularly preferred. The electron withdrawing group can be any suitable group that is capable of withdrawing electron density (particularly electron density from the π-orbital) from the aliphatic carbon-carbon multiple bond, thereby making the β-carbon atom of the carbon-carbon multiple bond (i.e., the carbon atom that is located in the β-position relative to the electron withdrawing group) more electrophilic and thus more receptive to nucleophilic conjugate addition reactions. Suitable electron withdrawing groups include, but are not limited to, halogens, a nitrile group, an imine group, fluorinated alkyl groups, a carbonyl group, a nitro group, a nitroso group, a sulfonyl group, and a sulfinyl group. Thus, in a preferred embodiment, the electron withdrawing group is selected from the group consisting of halogens, a nitrile group, an imine group, a fluorinated alkyl group, a carbonyl group, a nitro group, a nitroso group, a sulfonyl group, and a sulfinyl group. In another preferred embodiment, the electron withdrawing group is selected from the group consisting of a carbonyl group, such as the carbonyl group in an ester linkage. In one such preferred embodiment, the stabilizer is a compound of Formula (L) below:

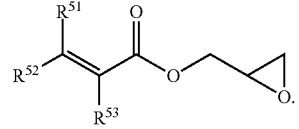

In Formula (L), $R^{51}$, $R^{52}$, and $R^{53}$ are independently selected from the group consisting of hydrogen, alkyl groups (e.g., $C_1$-$C_8$ alkyl groups), substituted alkyl groups (e.g., $C_1$-$C_8$ alkyl groups substituted with one or more halogens or a hydroxy group), olefinyl groups (e.g., $C_1$-$C_8$ olefinyl groups), and substituted olefinyl groups (e.g., $C_1$-$C_8$ olefinyl groups substituted with one or more halogens or a hydroxy group). As used herein, the term "olefinyl" refers to a univalent functional group formally derived by removing a hydrogen atom from an olefin (i.e., an aliphatic acyclic or cyclic hydrocarbon having one or more carbon-carbon double bonds). Suitable examples of olefinyl groups include, but are not limited to, prop-1-en-1-yl. In a preferred embodiment, $R^{51}$ and $R^{52}$ are independently selected from the group consisting of hydrogen, alkyl groups (e.g., $C_1$-$C_8$ alkyl groups), substituted alkyl groups (e.g., $C_1$-$C_8$ alkyl groups substituted with one or more halogens or a hydroxy group), olefinyl groups (e.g., $C_1$-$C_8$ olefinyl groups), and substituted olefinyl groups (e.g., $C_1$-$C_8$ olefinyl groups substituted with one or more halogens or a hydroxy group), and $R^{53}$ is selected from the group consisting of hydrogen, alkyl groups (e.g., $C_1$-$C_8$ alkyl groups), substituted alkyl groups (e.g., $C_1$-$C_8$ alkyl groups substituted with one or more halogens or a hydroxy group). Preferably, at least one of $R^{51}$, $R^{52}$, and $R^{53}$ is hydrogen. In another preferred embodiment, $R^{53}$ is hydrogen and at least one of $R^{51}$ and $R^{52}$ is hydrogen. Preferably, the compounds of Formula (L) terminate with an unsubstituted methylene group (e.g., $R^{51}$ and $R^{52}$ are hydrogen) or with a =C(CH$_3$)H group (e.g., $R^{51}$ is hydrogen and $R^{52}$ is methyl). Thus, if one of $R^{51}$ and $R^{52}$ is an olefinyl group or a substituted olefinyl group, the olefinyl or substituted olefinyl group preferably terminates with an unsubstituted methylene group or with a =C(CH$_3$)H group. In the compounds of Formula (L), $R^{51}$, $R^{52}$, and $R^{53}$ can be selected so that substituents attached to the carbon-carbon double bond are arranged in either the cis- or trans-configuration, with the trans-configuration being more preferred. Further, if one or more of $R^{51}$, $R^{52}$, and $R^{53}$ is an olefinyl group or a substituted olefinyl group, the substituents attached to the carbon-carbon double bonds of the olefinyl or substituted olefinyl group can be arranged in either the cis- or trans-configuration, with the trans-configuration being more preferred. In a preferred embodiment utilizing such stabilizers, the stabilizer is selected from the group consisting of glycidyl methacrylate, glycidyl sorbate, glycidyl 2-methyl 2-pentenoate, glycidyl 2-hexenoate, glycidyl tiglate, glycidyl crotonate, glycidyl 3-methyl crotonate, and mixtures thereof. In one particularly preferred embodiment, the stabilizer is glycidyl sorbate.

In another preferred embodiment, the stabilizer comprises a first epoxide group and an aliphatic carbon-carbon multiple bond conjugated with an aromatic group. As noted above, the carbon-carbon multiple bond can be a double bond or a triple bond, with a carbon-carbon double bond being particularly preferred. Stabilizers of this type include, but are not limited to compounds of Formula (LX) below

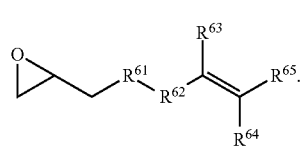
(LX)

In Formula (LX), $R^{61}$ is selected from —O— and —OC(O)—, and $R^{62}$ is a divalent aromatic or heteroaromatic group. Suitable divalent aromatic and heteroaromatic groups include phendiyl (e.g., phen-1,4-diyl), triazindiyl (e.g., triazin-2,4-diyl), pyrroldiyl (e.g., pyrrol-2,5-diyl), furandiyl (e.g., furan-2,5-diyl), and thiophendiyl (e.g., thiophen-2,5-diyl). In a preferred embodiment, $R^{62}$ is a phendiyl group, more preferably a phen-1,4-diyl group. In Formula (LX), $R^{63}$, $R^{64}$, and $R^{65}$ are independently selected from the group consisting of hydrogen, alkyl groups (e.g., $C_1$-$C_8$ alkyl groups), substituted alkyl groups (e.g., $C_1$-$C_8$ alkyl groups substituted with one or more halogens or a hydroxy group), olefinyl groups (e.g., $C_1$-$C_8$ olefinyl groups), and substituted olefinyl groups (e.g., $C_1$-$C_8$ olefinyl groups substituted with one or more halogens or a hydroxy group). In a preferred embodiment, $R^{63}$ is selected from the group consisting of hydrogen, alkyl groups (e.g., $C_1$-$C_8$ alkyl groups), and substituted alkyl groups, and $R^{64}$ and $R^{65}$ are independently selected from the group consisting of hydrogen, alkyl groups (e.g., $C_1$-$C_8$ alkyl groups), substituted alkyl groups (e.g., $C_1$-$C_8$ alkyl groups substituted with one or more halogens or a hydroxy group), olefinyl groups (e.g., $C_1$-$C_8$ olefinyl groups), and substituted olefinyl groups (e.g., $C_1$-$C_8$ olefinyl groups substituted with one or more halogens or a hydroxy group). Preferably, at least one of $R^{63}$, $R^{64}$, and $R^{65}$ is hydrogen. In another preferred embodiment, one of $R^{63}$, $R^{64}$, and $R^{65}$ is hydrogen, and the two remaining groups are independently selected from the group consisting of hydrogen, $C_1$-$C_8$ alkyl groups, and $C_1$-$C_8$ olefinyl groups (e.g., $C_1$-$C_8$ alkenyl groups). Preferably, the compounds of Formula (LX) terminate with an unsubstituted methylene group (e.g., $R^{64}$ and $R^{65}$ are hydrogen) or with a =C(CH$_3$)H group (e.g., $R^{64}$ is hydrogen and $R^{65}$ is methyl). Thus, if one of $R^{64}$ and $R^{65}$ is an olefinyl group or a substituted olefinyl group, the olefinyl or substituted olefinyl group preferably terminates with an unsubstituted methylene group or with a =C(CH$_3$)H group. In the compounds of Formula (LX), $R^{63}$, $R^{64}$, and $R^{65}$ can be selected so that substituents attached to the carbon-carbon double bond are arranged in either the cis- or trans-configuration, with the trans-configuration being more preferred. Further, if one or more of $R^{63}$, $R^{64}$, and $R^{65}$ is an olefinyl group or a substituted olefinyl group, the substituents attached to the carbon-carbon double bonds of the olefinyl or substituted olefinyl group can be arranged in either the cis- or trans-configuration, with the trans-configuration being more preferred. In a preferred embodiment utilizing such stabilizers, the stabilizer is selected from the group consisting of 2-[(p-styrenyloxy)methyl]oxirane, (2-oxiranyl)methyl p-styrenecarboxylate, and mixtures thereof.

The stabilizer amount can be present in the lubricant composition in any suitable amount. Preferably, the stabilizer is present in the lubricant composition in an amount of about 0.0001 wt. % or more, based on the total weight of the lubricant and stabilizer present in the lubricant composition.

More preferably, the stabilizer is present in the lubricant composition in an amount of about 0.001 wt. % or more, about 0.01 wt. % or more, about 0.1 wt. % or more, about 0.25 wt. % or more, or about 0.5 wt. % or more, based on the total weight of the lubricant and stabilizer present in the lubricant composition. Preferably, the stabilizer is present in the lubricant composition in an amount of about 20 wt. % or less, based on the total weight of the lubricant and stabilizer present in the lubricant composition. More preferably, the stabilizer is present in the lubricant composition in an amount of about 15 wt. % or less, about 10 wt. % or less, or about 5 wt. % or less, based on the total weight of the lubricant and stabilizer present in the lubricant composition. Thus, in a series of preferred embodiments, the stabilizer is present in the lubricant composition in an amount of about 0.0001 wt. % to about 20 wt. % (e.g., about 0.0001 wt. % to about 15 wt. %, about 0.0001 wt. % to about 10 wt. %, or about 0.0001 wt. % to about 5 wt. %), about 0.001 wt. % to about 20 wt. % (e.g., about 0.001 wt. % to about 15 wt. %, about 0.001 wt. % to about 10 wt. %, or about 0.001 wt. % to about 5 wt. %), about 0.01 wt. % to about 20 wt. % (e.g., about 0.01 wt. % to about 15 wt. %, about 0.01 wt. % to about 10 wt. %, or about 0.01 wt. % to about 5 wt. %), about 0.1 wt. % to about 20 wt. % (e.g., about 0.1 wt. % to about 15 wt. %, about 0.1 wt. % to about 10 wt. %, or about 0.1 wt. % to about 5 wt. %), about 0.25 wt. % to about 20 wt. % (e.g., about 0.25 wt. % to about 15 wt. %, about 0.25 wt. % to about 10 wt. %, or about 0.25 wt. % to about 5 wt. %), or about 0.5 wt. % to about 20 wt. % (e.g., about 0.5 wt. % to about 15 wt. %, about 0.5 wt. % to about 10 wt. %, or about 0.5 wt. % to about 5 wt. %), based on the total weight of the lubricant and stabilizer present in the lubricant composition.

The lubricant composition can contain additional or auxiliary stabilizers in addition to the stabilizer described above. Suitable auxiliary stabilizers include, but are not limited to, alkylated naphthalene compounds, phenol-based compounds, diene-based compounds, phosphite compounds, phosphate compounds, nitrogen-containing compounds, epoxide-containing compounds, isobutylene, and mixtures thereof.

Suitable alkylated naphthalene compounds include those compounds in which one or more of the eight hydrogen atoms of the naphthalene core is replaced by a linear or branched alkyl group. Suitable alkylated naphthalene compounds include those sold by King Industries under the trade designations NA-LUBE KR-007A; NA-LUBE KR-008, NA-LUBE KR-009; NA-LUBE KR-015; NA-LUBE KR-019; NA-LUBE KR-005FG; NA-LUBE KR-015FG; and NA-LUBE KR-029FG.

Suitable phenol-based compounds include 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4- hydroxybenzyl)sulfide, tocopherol, hydroquinone, 2,2'6,6'-tetra-tert-butyl-4,4'-methylenediphenol and t-butyl hydroquinone. Among these, 2,6-di-tert-butyl-4-methylphenol (BHT) is particularly preferred.

Suitable diene-based compounds include $C_3$ to $C_{15}$ dienes and compounds formed by the reaction of any two or more $C_3$ to $C_4$ dienes. Preferably, the diene-based compounds are selected from the group consisting of allyl ethers, propadiene, butadiene, isoprene, and terpenes. The diene-based compounds are preferably terpenes, which include, but are not limited to, terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Patent Application Publication No. US 2006/0167044 A1, which is incorporated herein by reference.

Suitable auxiliary stabilizers include phosphite and phosphate compounds. Suitable phosphite compounds include diaryl, dialkyl, triaryl and/or trialkyl phosphites, and/or mixed aryl/alkyl di- or tri-substituted phosphites, in particular one or more compounds selected from hindered phosphites, tris-(di-tert-butylphenyl)phosphite, di-n-octyl phosphite, iso-octyl diphenyl phosphite, iso-decyl diphenyl phosphite, tri-iso-decyl phosphate, triphenyl phosphite and diphenyl phosphite, particularly diphenyl phosphite. Suitable phosphate compounds include triaryl phosphates, trialkyl phosphates, alkyl mono acid phosphates, aryl diacid phosphates, amine phosphates, preferably triaryl phosphates and/or trialkyl phosphates, particularly tricresyl phosphate and/or tri-n-butyl phosphates.

Suitable nitrogen-containing auxiliary stabilizers include secondary or tertiary amines, such as diphenylamine, p-phenylenediamine, triethylamine, tributylamine, diisopropylamine, triisopropylamine and triisobutylamine. Suitable amine-based auxiliary stabilizers include amine antioxidants, such as a substituted piperidine compound, i.e. a derivative of an alkyl substituted piperidyl, piperidinyl, piperazinone, or alkoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N-(1,3-dimethylbutyl)-p-phenylenediamine or N,N-di-sec-butyl-p-phenylenediamine and hydroxylamines such as tallow amines, methyl bis tallow amine and bis tallow amine, or phenol-alpha-napththylamine or Tinuvin®765 (Ciba), BLS®944 (Mayzo Inc) and BLS® 1770 (Mayzo Inc). Suitable amine-based compounds also include alkyldiphenyl amines such as bis (nonylphenyl amine), dialkylamine such as (N-(1-methylethyl)-2-propylamine, or one or more of phenyl-alpha-naphthyl amine (PANA), alkyl-phenyl-alpha-naphthyl-amine (APANA), and bis (nonylphenyl) amine. Preferably, the amine-based auxiliary stabilizer is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen-containing compounds identified above, suitable nitrogen-containing stabilizers include one or more compounds selected from dinitrobenzene, nitrobenzene, nitromethane, nitrosobenzene, and TEMPO [(2,2,6,6-tetramethylpiperidin-1-yl) oxyl].

Epoxide-containing compounds suitable for use as auxiliary stabilizers include aromatic epoxides, alkyl epoxides, and alkenyl epoxides.

In a preferred embodiment, the lubricant composition comprises one or more auxiliary stabilizers selected from the group consisting of diene-based compounds (e.g., farnesene), alkylated naphthalene compounds, phenol-based compounds (e.g., BHT), isobutylene, and mixtures thereof. Thus, in one preferred embodiment, the lubricant composition further comprises farnesene, an alkylated naphthalene compound, and BHT. In another preferred embodiment, the lubricant further comprises isobutylene, an alkylated naphthalene compound, and BHT.

If used, the auxiliary stabilizer(s) can be present in the lubricant composition in any suitable amount. Generally, the auxiliary stabilizer is present in the lubricant composition in an amount of about 0.0001 wt. % or more, based on the weight of auxiliary stabilizer and lubricant present in the lubricant composition. Preferably, the auxiliary stabilizer is present in the lubricant composition in an amount of about 0.001 wt. % or more, about 0.01 wt. %, or about 0.1 wt. % or more, based on the weight of auxiliary stabilizer and lubricant present in the lubricant composition. The auxiliary stabilizer preferably is present in the lubricant composition in an amount of about 20 wt. % or less, about 15 wt. % or less, about 12 wt. % or less, about 10 wt. % or less, about 5 wt. % or less, about 2.5 wt. % or less, or about 1 wt. % or less, based on the weight of auxiliary stabilizer and lubricant present in the lubricant composition. Thus, in a series of preferred embodiments, the auxiliary stabilizer is present in the lubricant composition in an amount of about 0.0001 wt. % to about 20 wt. % (e.g., about 0.0001 wt. % to about 15 wt. %, about 0.0001 wt. % to about 12 wt. %, about 0.0001 wt. % to about 10 wt. %, about 0.0001 wt. % to about 5 wt. %, about 0.0001 wt. % to about 2.5 wt. %, or about 0.0001 wt. % to about 1 wt. %), about 0.001 wt. % to about 20 wt. % (e.g., about 0.001 wt. % to about 15 wt. %, about 0.001 wt. % to about 12 wt. %, about 0.001 wt. % to about 10 wt. %, about 0.001 wt. % to about 5 wt. %, about 0.001 wt. % to about 2.5 wt. %, or about 0.001 wt. % to about 1 wt. %), about 0.01 wt. % to about 20 wt. % (e.g., about 0.01 wt. % to about 15 wt. %, about 0.01 wt. % to about 12 wt. %, about 0.01 wt. % to about 10 wt. %, about 0.01 wt. % to about 5 wt. %, about 0.01 wt. % to about 2.5 wt. %, or about 0.01 wt. % to about 1 wt. %), or about 0.1 wt. % to about 20 wt. % (e.g., about 0.1 wt. % to about 15 wt. %, about 0.1 wt. % to about 12 wt. %, about 0.1 wt. % to about 10 wt. %, about 0.1 wt. % to about 5 wt. %, about 0.1 wt. % to about 2.5 wt. %, or about 0.1 wt. % to about 1 wt. %). If an alkylated naphthalene is used as an auxiliary stabilizer, the alkylated naphthalene preferably is present in the lubricant composition in an amount of about 0.1 wt. % to about 20 wt. %, about 5 wt. % to about 15 wt. %, or about 8 wt. % to about 12 wt. %, based on the weight of alkylated naphthalene and lubricant present in the lubricant composition.

In a second embodiment, the invention provides a heat transfer composition comprising a lubricant composition as described above and a haloalkane. The heat transfer composition can be used as a heat transfer medium/fluid in air conditioning and refrigeration systems, such as residential air conditioning systems, residential heat pumps, residential air to water heat pump/hydronic systems, industrial air conditioning systems, commercial air conditioning systems (e.g., packaged rooftop air conditioning units and variable refrigerant flow systems), commercial heat pump systems (e.g., commercial air source, water source, and ground source heat pump systems), mobile or vehicle air conditioning systems (e.g., automobile, train, or bus air conditioning systems), mobile heat pumps (e.g., electric vehicle heat pumps), low temperature refrigeration systems, medium temperature refrigeration systems, commercial refrigerators, commercial freezers, ice machines, vending machines, transport refrigeration systems, domestic freezers, domestic refrigerators, industrial freezers, industrial refrigerators, and chillers. The applications for such heat transfer compositions and methods for using the same in such applications are disclosed in U.S. Pat. No. 10,815,409 B2 (Sethi et al.), which is hereby incorporated by reference.

The lubricant composition can be any embodiment of the lubricant composition described above. The lubricant composition can be present in the heat transfer composition in any suitable amount. Preferably, the lubricant composition is present in the heat transfer composition in an amount of about 0.01 wt. % or more, about 0.1 wt. % or more, or about 1 wt. % or more, based on the total weight of the heat transfer composition. The lubricant composition preferably is present in the heat transfer composition in an amount of about 70 wt. % or less, about 50 wt. % or less, about 40 wt. % or less, about 30 wt. % or less, about 20 wt. % or less, about 15 wt. % or less, about 10 wt. % or less, or about 5 wt. % or less, based on the total weight of the heat transfer composition. Thus, in a series of preferred embodiment, the lubricant composition is present in the heat transfer composition in an amount of about 0.01 wt. % to about 70 wt. % (e.g., about 0.01 wt. % to about 50 wt. %, about 0.01 wt. % to about 40 wt. %, about 0.01 wt. % to about 30 wt. %, about 0.01 wt. % to about 20 wt. %, about 0.01 wt. % to about 15 wt. %, about 0.01 to about 10 wt. %, or about 0.01 to about 5 wt. %), about 0.1 wt. % to about 70 wt. % (e.g., about 0.1 wt. % to about 50 wt. %, about 0.1 wt. % to about 40 wt. %, about 0.1 wt. % to about 30 wt. %, about 0.1 wt. % to about 20 wt. %, about 0.1 wt. % to about 15 wt. %, about 0.1 to about 10 wt. %, or about 0.1 to about 5 wt. %), or about 1 wt. % to about 70 wt. % (e.g., about 1 wt. % to about 50 wt. %, about 1 wt. % to about 40 wt. %, about 1 wt. % to about 30 wt. %, about 1 wt. % to about 20 wt. %, about 1 wt. % to about 15 wt. %, about 1 to about 10 wt. %, or about 1 to about 5 wt. %).

As noted above, the heat transfer composition comprises a haloalkane in addition to the lubricant composition. The heat transfer composition can contain any suitable haloalkane or combination of haloalkanes, with iodoalkanes and fluoroalkanes being particularly preferred. In a preferred embodiment, the heat transfer composition comprises an iodoalkane. Preferably, the heat transfer composition comprises trifluoroiodomethane. As noted above, the heat transfer composition can comprise a one or more additional haloalkanes. In a preferred embodiment, this additional haloalkane is a fluoroalkane. Suitable fluoroalkanes include difluoromethane, pentafluoroethane, and mixtures thereof. Thus, in one preferred embodiment, the heat transfer composition further comprises at least one second haloalkane selected from the group consisting of difluoromethane, pentafluoroethane, and mixtures thereof. In a particularly preferred embodiment, the heat transfer composition further comprises difluoromethane and pentafluoroethane. When the heat transfer composition comprises two or more haloalkanes, the haloalkanes can be present in the heat transfer composition in any suitable relative amounts. In one preferred embodiment, the heat transfer composition comprises about 45 wt. % to about 55 wt. % difluoromethane, about 7 wt. % to about 17 wt. % pentafluoroethane, and about 35 wt. % to about 45 wt. % trifluoroiodomethane, based on the total weight of difluoromethane, pentafluoroethane, and trifluoroiodomethane present in the heat transfer composition. In a particularly preferred embodiment, the heat transfer composition comprises about 49 wt. % (e.g., 49±0.3 wt. %) difluoromethane, about 11.5 wt. % (e.g., 11.5±0.3 wt. %) pentafluoroethane, and about 39.5 wt. % (e.g., 39.5±0.3 wt. %) trifluoroiodomethane, based on the total weight of difluoromethane, pentafluoroethane, and trifluoroiodomethane present in the heat transfer composition.

Lubricant compositions and heat transfer compositions containing a stabilizer as described above have been observed to exhibit increased stability and/or resistance to degradation as compared to compositions containing conventional stabilizers alone, such as the secondary or auxiliary stabilizers described above. For example, lubricant and heat transfer compositions according to the invention have been subjected to elevated temperatures similar to those encountered by heat transfer fluids in refrigeration systems and the inventive compositions have shown markedly decreased degradation as compared to compositions stabilized with conventional stabilizers. The mechanism by which the inventive stabilizer works to provide this enhanced stabilization is not fully understood. However, while not wishing to bound to any particular theory, the inventors believe that the epoxide functional group functions as an anchor to bond the stabilizer molecules to metal surfaces. The second functional group (i.e., a second epoxide group or a carbon-carbon multiple bond as described above) is then believed to act as a scavenger that reacts with any activated species that form within the composition, such as a fluorocarbon free radical (e.g., $.CF_3$) or a fluorocarbon anion (e.g., $CF_3^-$). When such activated species react with the stabilizer, they are sequestered and inactivated so that they are no longer available to deleteriously react with other components in the composition (e.g., the lubricant) or the refrigeration system (e.g., metal components in the refrigeration system). Given the increased stability that has been observed, it is believed that the compositions of the invention are especially well suited for use in refrigeration systems as described above.

The following examples further illustrate the subject matter described above but, of course, should not be construed as in any way limiting the scope thereof.

Example 1

This example demonstrates the production of lubricant and heat transfer compositions according to the invention and the stability of those compositions when subjected to ASHRAE STD 97 testing.

The stabilizing performance of several stabilizers according to the invention (the compounds are identified in Table 1 below) was tested in accordance with ASHRAE STD 97, which is entitled "Sealed Glass Tube Method to Test the Chemical Stability of Materials for Use within Refrigerant Systems." Each of the compounds was added to a refrigerant lubricant at 3 wt. % unless otherwise noted. The lubricant oil was a polyol ester lubricant, specifically Emkarate RL lubricant 32-3MAF from NU-CALGON. Then 0.6 gram of an iodoalkane, specifically 1,4-Diiodooctafluorobutane ($C_4F_8I_2$), was mixed with 2 grams of the stabilized lubricant, and the resulting mixture was transferred to a glass tube. (The 1,4-Diiodooctafluorobutane ($C_4F_8I_2$) was chosen for this series of tests because it is liquid at room temperature and, therefore, could be easily handled. Further, this iodoalkane was chosen because it is believed that its degradation products would be similar to those of trifluoroiodomethane.) Metal coupons made of copper, steel, aluminum, and, optionally, high purity zinc (>99%) were added to each glass tube. Each filled glass tube was moved to a vacuum line, degassed twice by the freeze-thaw circle, and then sealed with an open flame under about 100 mTorr vacuum. The sealed tube was moved into an oven maintained at 150° C. All samples were clear and colorless when first placed in the oven. The appearance of the oil in each vial was observed and recorded at intervals of 3, 6, 9, 12 and 14 days. The oil was considered to have degraded when the oil turned dark (or even black). The number of days it took for each sample to degrade is recorded in Table 1 below.

TABLE 1

Results of stability testing for various stabilizers and a control.

| Sample | Stabilizer | Stability With Zinc | Stability Without Zinc |
|---|---|---|---|
| 1 | None | <3 days | <3 days |
| 2 | Glycidyl methacrylate | >14 days | >14 days |
| 3 | Trimethylolpropane triglycidyl ether (technical grade) | >3 days and <6 days | >14 days |
| 4 | 1,2,7,8-Diepoxyoctane | >14 days | >14 days |
| 5 | Glycidyl sorbate | >14 days | >14 days |
| 6 | 1,4-Butanediol diglycidyl ether (4.27 wt. %) | >14 days | >14 days |
| 7 | Glycidyl 2-methyl 2-pentenate | <3 days | >14 days |
| 8 | Glycidyl 2-hexenoate | <3 days | >14 days |
| 9 | Glycidyl tiglate | >9 days and <12 days | >14 days |
| 10 | Glycidyl crotonate | >12 days and <14 days | >14 days |
| 11 | Glycidyl 3-methyl crotonate | <3 days | >14 days |

As can be seen from the data in Table 1, the control composition (Sample 1) containing only the lubricant and the iodoalkane degraded in less than 3 days when no zinc coupon was included. By way of contrast, all of the samples containing a stabilizer according to the invention showed no observable degradation at the fourteenth day under the same conditions. The absence of observable degradation shows that each stabilizer was highly effective at stabilizing the composition under these conditions.

The results observed when zinc coupons were included are more nuanced. When a zinc coupon was included, the control composition (Sample 1) again degraded in less than 3 days. By way of contrast, Samples 4, 5, and 6 showed no observable degradation for the duration of the test. Samples 9 and 10 only showed observable degradation between the ninth and fourteenth days, which is still a substantial increase over the control composition. Sample 3 also showed increased stability relative to Sample 1, but the sample had observably degraded by the sixth day. Lastly, while Samples 7, 8, and 11 did not show increased stability with the observation intervals employed in this test, the inventors believe that discernible differences would have been observed if more frequent observations had been made in the early part of the test.

Example 2

This example demonstrates the production of lubricant and heat transfer compositions according to the invention and the stability of those compositions when subjected to ASHRAE STD 97 testing.

The stabilizing performance of several stabilizers according to the invention (the compounds are identified in Tables 2 below) was tested in accordance with ASHRAE STD 97. The amount of stabilizer indicated in Table 3, 4, or 5 was added to a refrigerant lubricant, specifically an ISO 32 POE having a viscosity at 40° C. of about 32 cSt. Glass tubes were then filled with a mixture containing 50 wt. % of R-466A (a refrigerant containing 49 wt. % difluoromethane, 11.5 wt. % pentafluoroethane, and 39.5 wt. % trifluoroiodomethane) and 50 wt. % of the stabilized lubricant, as well as coupons of steel, copper (Cu), aluminum (Al), and optionally brass or zinc. The tube was then degassed and sealed. In some cases, a small amount of air and water were included in the tube as noted below. The sealed tubes were then placed in an oven maintained at about 150° C. for 14 days. After the fourteenth day, each sealed tube was broken, and the refrigerant and oil were collected and separated. The recovered lubricant was then evaluated visually evaluated and tested to determine the concentration of metal and halide elements in the lubricant and the total acid number (TAN) of the lubricant. The recovered refrigerant was analyzed using gas chromatography to measure the amount of trifluoromethane (R-23), which is a degradation product of the trifluoroiodomethane present in the R-466A refrigerant. The results of these tests are set forth in Tables 2, 3, and 4 below.

TABLE 2

Stabilizers utilized in the following examples.

| Stabilizer | Chemical name |
|---|---|
| EX-1 | Glycidyl methacrylate |
| EX-2 | Trimethylolpropane triglycidyl ether (technical grade) |
| EX-3 | 1,2,7,8-Diepoxyoctane |
| EX-4 | Glycidyl sorbate |

TABLE 3

Results for samples containing 1.7 vol. % air and 300 ppm of water.

| Coupons Included | Steel, Cu, Al | Steel, Cu, Al, Brass | Steel, Cu, Al | Steel, Cu, Al, Brass | Steel, Cu, Al | Steel, Cu, Al, Brass |
|---|---|---|---|---|---|---|
| Stabilizer | None | None | 3 wt. % EX-1 | 3 wt. % EX-1 | 3 wt. % EX-2 | 3 wt. % EX-2 |
| Color | Yellow | Slightly Yellow | Colorless | Colorless | Colorless | Colorless |
| Fluoride (ppm) | 50 | 57 | 28 | 6 | 8 | 15 |
| Iodide (ppm) | 22 | 503 | 100 | 101 | 126 | 92 |
| Al (ppm) | <3 | <3 | <3 | <3 | <3 | <3 |
| Iron (ppm) | 5 | <2 | <2 | <2 | <2 | <2 |
| Cu (ppm) | 26 | 5 | 4 | 3 | 2 | 3 |
| Zinc (ppm) | NA | 122 | NA | <1 | NA | <1 |
| TAN | 4 | 6.6 | NA | NA | <0.1 | 0.4 |
| R-23 (ppm) | 11570 | 7545 | 70 | 30 | 750 | 530 |

TABLE 4

Results for samples containing no air or water.

| Coupons | Steel, Cu, Al | Steel, Cu, Al, Brass | Steel, Cu, Al | Steel, Cu, Al, Brass |
|---|---|---|---|---|
| Stabilizer | 3 wt. % EX-3 | 3 wt. % EX-3 | 1 wt. % EX-4 | 1 wt. % EX-4 |
| Color | Colorless | Colorless | Colorless | Colorless |
| Fluoride (ppm) | 1 | 4 | 1 | 2 |
| Iodide (ppm) | 620 | 2030 | <1.5 | <1.5 |
| Al (ppm) | <3 | <3 | <3 | <3 |
| Iron(ppm) | <2 | <2 | <2 | <2 |
| Cu (ppm) | <1 | 2 | <1 | 1 |
| Zinc (ppm) | NA | <1 | NA | <1 |
| TAN | <0.1 | <0.1 | <0.1 | <0.1 |
| R-23 (ppm) | 1650 | 3330 | 60 | 70 |

TABLE 5

Results for additional samples containing no air or water.

| Coupons | Steel, Cu, Al | Steel, Cu, Al, Brass | Steel, Cu, Al | Steel, Cu, Al, Brass |
|---|---|---|---|---|
| Stabilizer | 2 wt. % EX-4 | 2 wt. % EX-4 | 3 wt. % EX-4 | 3 wt. % EX-4 |
| Color | Colorless | Colorless | Colorless | Colorless |
| Fluoride (ppm) | 2 | <1 | 2 | 1 |
| Iodide (ppm) | 3 | <1.5 | 5 | <1.5 |
| Al (ppm) | <3 | <3 | <3 | 4 |
| Iron(ppm) | <2 | 9 | 3 | 8 |
| Cu (ppm) | 10 | 4 | 4 | 3 |
| Zinc (ppm) | NA | 8 | NA | <1 |
| TAN | <0.1 | <0.1 | <0.1 | <0.1 |
| R-23 (ppm) | 50 | 60 | 60 | 80 |

TABLE 6

Results for additional samples containing 1.7 vol. % air and 300 ppm of water.

| Coupons | Steel, Cu, Al | Steel, Cu, Al, Brass | Steel, Cu, Al, Zinc | Steel, Cu, Al, Brass | Steel, Cu, Al, Zinc | Steel, Cu, Al, Brass |
|---|---|---|---|---|---|---|
| Stabilizer | None | None | None | 1 wt. % EX-4 | 1 wt. % EX-4 | 1 wt. % EX-4 |
| Color | Yellow | Slightly yellow | Yellow | Colorless | Colorless | Colorless |
| Fluoride (ppm) | 50 | 57 | 52 | 1 | 2 | 2 |
| Iodide (ppm) | 22 | 503 | 17100 | <1.5 | <1.5 | <1.5 |
| Al (ppm) | <3 | <3 | 4 | <3 | <3 | <3 |
| Iron(ppm) | 5 | <2 | 9 | <2 | <2 | <2 |
| Cu (ppm) | 26 | 5 | 5 | 3 | 2 | 3 |
| Zinc (ppm) | NA | 122 | 5380 | NA | <1 | 2 |
| TAN | 4.0 | 6.6 | 13.0 | <0.1 | 0.1 | 0.1 |
| R-23 (ppm) | 11570 | 7545 | 15670 | 70 | 75 | 75 |

As can be seen from the data in Tables 3-6, the compositions containing a stabilizer according to the invention exhibited significantly less degradation than the samples that did not contain such a stabilizer. For example, each of the samples utilizing a stabilizer according to the invention contained significantly less R-23 than the control samples without a stabilizer. Further, when comparing samples that utilized the same combination of metal coupons, the amount of metals measured in the lubricant for the samples containing a stabilizer according to the invention was significantly lower than the amount of metals in the control samples. These results were consistently observed for all combination of metal coupons that were tested, which indicates that the inventive stabilizers can be deployed in a wide range of refrigeration systems made from different metals.

Example 3

This example demonstrates the production of lubricant and heat transfer compositions according to the invention and the stability of those compositions when subjected to ASHRAE STD 97 testing.

The procedure described in Example 2 was repeated using a PVE lubricant, specifically Daphne Hermetic Oil FVC68D from Idemitsu. In addition to the refrigerant and lubricant, the glass tubes were charged with 1.7 vol. % air and 300 ppm of water. The results of the testing are set forth in Table 7 below.

TABLE 7

| Coupons | Steel, Cu, Al | Steel, Cu, Al | Steel, Cu, Al, Brass |
|---|---|---|---|
| Additives | None | 1 wt. % EX-4 | 1 wt. % EX-4 |
| Color | Black | Colorless | Colorless |
| Fluoride (ppm) | 520 | 3 | 3 |
| Iodide (ppm) | 23 | 8 | 15 |
| Al (ppm) | 851 | <3 | <3 |
| Iron(ppm) | 11 | <2 | <2 |
| Cu (ppm) | 182 | 1 | 2 |
| Zinc (ppm) | NA | <1 | <1 |
| TAN | 41.6 | <0.1 | <0.1 |
| R-23 (ppm) | 19500 | 465 | 525 |

The data in Table 7 again demonstrate that the compositions containing a stabilizer according to the invention exhibited significantly less degradation than the sample that did not contain such a stabilizer. Each of the samples utilizing a stabilizer according to the invention contained significantly less R-23 than the control sample without a stabilizer. Further, the amount of metals measured in the lubricant for the samples containing a stabilizer according to the invention was significantly lower than the amount of metals in the control samples. These results further confirm the efficacy of the inventive compositions and the enhanced stability that is obtained by utilizing a stabilizer as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A heat transfer composition comprising:
   (a) a lubricant composition comprising:
      (i) a lubricant; and
      (ii) glycidyl sorbate; and
   (b) a haloalkane composition comprising trifluoroiodomethane, difluoromethane, and pentafluoroethane.

2. The heat transfer composition of claim 1, wherein the lubricant is selected from the group consisting of polyol esters, polyalkylene glycols, silicone oils, mineral oil, alkylbenzenes, polyvinyl ethers, poly(alpha-olefins), and mixtures thereof.

3. The heat transfer composition of claim 2, wherein the lubricant is a polyol ester lubricant.

4. The heat transfer composition of claim 2, wherein the lubricant is a polyvinyl ether lubricant.

5. The heat transfer composition of claim 1, wherein glycidyl sorbate is present in the lubricant composition in an amount of about 0.01 wt. % to about 20 wt.%, based on the total weight of the lubricant and glycidyl sorbate present in the lubricant composition.

6. The heat transfer composition of claim 1, wherein the lubricant composition is present in the heat transfer composition in an amount of about 0.1 wt. % to about 70 wt. % based on the total weight of the heat transfer composition.

7. The heat transfer composition of claim 1, wherein the heat transfer composition comprises about 45 wt. % to about 55 wt. % difluoromethane, about 7 wt. % to about 17 wt. % pentafluoroethane, and about 35 wt. % to about 45 wt. % trifluoroiodomethane, based on the total weight of difluoromethane, pentafluoroethane, and trifluoroiodomethane present in the heat transfer composition.

* * * * *